(12) United States Patent
Edwards

(10) Patent No.: US 12,024,289 B2
(45) Date of Patent: Jul. 2, 2024

(54) REDUCED-FRICTION ROLLER AND RELATED ASSEMBLY FOR A MOVEABLE CONTROL SURFACE OF AN AIRCRAFT

(71) Applicant: Gulfstream Aerospace Corporation, Savannah, GA (US)

(72) Inventor: Anthony V. Edwards, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 44 days.

(21) Appl. No.: 17/821,696

(22) Filed: Aug. 23, 2022

(65) Prior Publication Data

US 2024/0067327 A1   Feb. 29, 2024

(51) Int. Cl.
| | |
|---|---|
| *B64C 9/04* | (2006.01) |
| *B64C 9/02* | (2006.01) |
| *B64C 9/18* | (2006.01) |
| *F16C 19/36* | (2006.01) |

(52) U.S. Cl.
CPC .................. *B64C 9/04* (2013.01); *B64C 9/02* (2013.01); *B64C 9/18* (2013.01); *F16C 19/36* (2013.01); *F16C 2326/43* (2013.01)

(58) Field of Classification Search
CPC .... B64C 5/10; B64C 5/08; B64C 3/50; B64C 9/18; B64C 9/02; F16C 19/36
See application file for complete search history.

(56) References Cited

U.S. PATENT DOCUMENTS

| | | | |
|---|---|---|---|
| 3,594,851 A | * | 7/1971 | Swatton .................... B64C 9/02 244/215 |
| 4,784,355 A | * | 11/1988 | Brine ......................... B64C 9/16 244/216 |
| 6,195,838 B1 | | 3/2001 | Mains et al. |
| 2011/0031351 A1 | | 2/2011 | Wildman |
| 2011/0042525 A1 | | 2/2011 | Parker |
| 2012/0061524 A1 | * | 3/2012 | Schlipf ...................... B64C 9/22 244/214 |
| 2015/0298795 A1 | * | 10/2015 | Parker ........................ B64C 9/02 244/214 |
| 2019/0233081 A1 | * | 8/2019 | Budnitsky ................. B64C 9/02 |
| 2019/0283863 A1 | * | 9/2019 | Bowers ..................... B64C 9/16 |
| 2023/0054504 A1 | * | 2/2023 | Schlipf ...................... B64C 9/02 |
| 2023/0339598 A1 | * | 10/2023 | Trinchillo ................. B64C 9/22 |

FOREIGN PATENT DOCUMENTS

WO        2015121521 A1       8/2015

* cited by examiner

*Primary Examiner* — Tien Q Dinh
*Assistant Examiner* — William L Gmoser
(74) *Attorney, Agent, or Firm* — Lorenz & Kopf, LLP

(57) ABSTRACT

A roller for a control surface of an aircraft includes a roller shaft, a primary roller coupled to the shaft, and a roller assembly coupled to the shaft. The shaft includes a longitudinal axis, a mounting end that couples with a roller fitting of the control surface, and a roller end. The primary roller can rotate about the longitudinal axis, and can engage and roll along a first surface of a track. The roller assembly includes a secondary roller having a longitudinal roller axis and configured to engage and roll along a second surface of the track. The roller assembly also includes a housing that retains the secondary roller while allowing the secondary roller to rotate about the longitudinal roller axis. The housing is movably coupled to the roller end of the roller shaft with three degrees of rotational freedom relative to the roller end of the roller shaft.

17 Claims, 11 Drawing Sheets

REDUCED-FRICTION ROLLER AND RELATED ASSEMBLY FOR A MOVEABLE CONTROL SURFACE OF AN AIRCRAFT

TECHNICAL FIELD

Embodiments of the subject matter described herein relate generally to aircraft assemblies and components. More particularly, embodiments of the subject matter relate to a roller and corresponding assembly for a moveable control surface of an aircraft.

BACKGROUND

Aircraft (such as an airplane) include moveable control surfaces that are actuated to adjust the flight attitude of the aircraft. Ailerons, elevators, rudders, spoilers, flaps, slats, and air brakes are moveable control surfaces that can be controlled by aircraft pilots. A moveable control surface may include or cooperate with a suitable control/actuation system that regulates the movement and position of the moveable control surface.

Some aircraft utilize a track to which a moveable control surface is coupled. Deployment of the moveable control surface results in movement that is guided by, restricted by, or otherwise defined by the layout, configuration, and design of the track. For example, a wing of an aircraft may include a number of flap tracks that support and guide one or more moveable flaps. A moveable flap can be coupled to at least one flap track using flap rollers that allow the flap to move smoothly from a stowed position to a deployed position.

Over time, a flap roller experiences normal wear and tear due to physical contact with the track. Accordingly, flap rollers are fabricated and configured to be serviceable (re-placeable) components. Unfortunately, replacing flap rollers results in downtime of the aircraft, and the maintenance and replacement cost (components and maintenance personnel) can be significant.

Accordingly, it is desirable to have a roller for a moveable surface of an aircraft that has a long lifespan and/or is relatively maintenance free. In addition, it is desirable to have an associated assembly or system that includes one or more of such rollers. Furthermore, other desirable features and characteristics will become apparent from the subsequent detailed description and the appended claims, taken in conjunction with the accompanying drawings and the foregoing technical field and background.

BRIEF SUMMARY

The subject matter disclosed herein relates to an improved flap roller suitable for use in aircraft applications. Embodiments of the disclosed invention mitigate excessive roller wear caused by roller contact with certain portions of the corresponding flap track, e.g., the flap track web. Certain embodiments utilize a web roller installed in the end of the flap roller, wherein the web roller facilitates reduced-friction contact and movement of the flap roller relative to the flap track web.

A roller for a moveable control surface of an aircraft is disclosed here. The moveable control surface has a roller fitting to accommodate the roller, and the aircraft has a track to accommodate the roller during actuation of the moveable control surface. An embodiment of the roller includes: a roller shaft; a primary roller; and a roller assembly. The roller shaft has a longitudinal shaft axis, a mounting end configured to couple with the roller fitting of the moveable control surface, and a roller end opposite the mounting end. The primary roller is coupled to the roller end of the roller shaft and is configured to rotate about the longitudinal shaft axis. The primary roller is configured to engage and roll along a first surface of the track. The roller assembly is coupled to the roller end of the roller shaft. The roller assembly includes: a secondary roller having a longitudinal roller axis, the secondary roller configured to engage and roll along a second surface of the track; and a housing that retains the secondary roller while allowing the secondary roller to rotate about the longitudinal roller axis. The housing is movably coupled to the roller end of the roller shaft with three degrees of rotational freedom relative to the roller end of the roller shaft.

A roller assembly for an aircraft having a moveable control surface is also disclosed here. An embodiment of the roller assembly includes: a roller fitting configured to be coupled to the moveable control surface; a track having a first bearing surface and a second bearing surface, the track configured to be coupled to a structure of the aircraft in a fixed position relative to the structure; and a roller. An embodiment of the roller includes a roller shaft having a longitudinal shaft axis, a mounting end configured to couple with the roller fitting, and a roller end opposite the mounting end. This embodiment of the roller also includes a primary roller coupled to the roller end of the roller shaft and configured to rotate about the longitudinal shaft axis. The primary roller is configured to engage and roll along the first bearing surface of the track. This embodiment of the roller also includes a roller assembly coupled to the roller end of the roller shaft. The roller assembly includes: a secondary roller having a longitudinal roller axis, the secondary roller configured to engage and roll along the second bearing surface of the track; and a housing that retains the secondary roller while allowing the secondary roller to rotate about the longitudinal roller axis. The housing is movably coupled to the roller end of the roller shaft with three degrees of rotational freedom relative to the roller end of the roller shaft.

An aircraft is also disclosed here. An embodiment of the aircraft includes: a wing; a control surface movably coupled to the wing; a roller fitting coupled to the control surface; a track having a first bearing surface and a second bearing surface, the track coupled to the wing in a fixed position relative to the wing; and a roller. An embodiment of the roller includes: a roller shaft; a primary roller coupled to the roller shaft; and a roller assembly coupled to the roller shaft. The roller shaft includes: a longitudinal shaft axis; a mounting end coupled to the roller fitting; and a roller end opposite the mounting end. The primary roller is coupled to the roller end of the roller shaft and is configured to rotate about the longitudinal shaft axis. The primary roller is configured to engage and roll along the first bearing surface of the track. The roller assembly is coupled to the roller end of the roller shaft. The roller assembly includes: a secondary roller having a longitudinal roller axis, the secondary roller configured to engage and roll along the second bearing surface of the track; and a housing that retains the secondary roller while allowing the secondary roller to rotate about the longitudinal roller axis, wherein the housing is movably coupled to the roller end of the roller shaft with three degrees of rotational freedom relative to the roller end of the roller shaft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
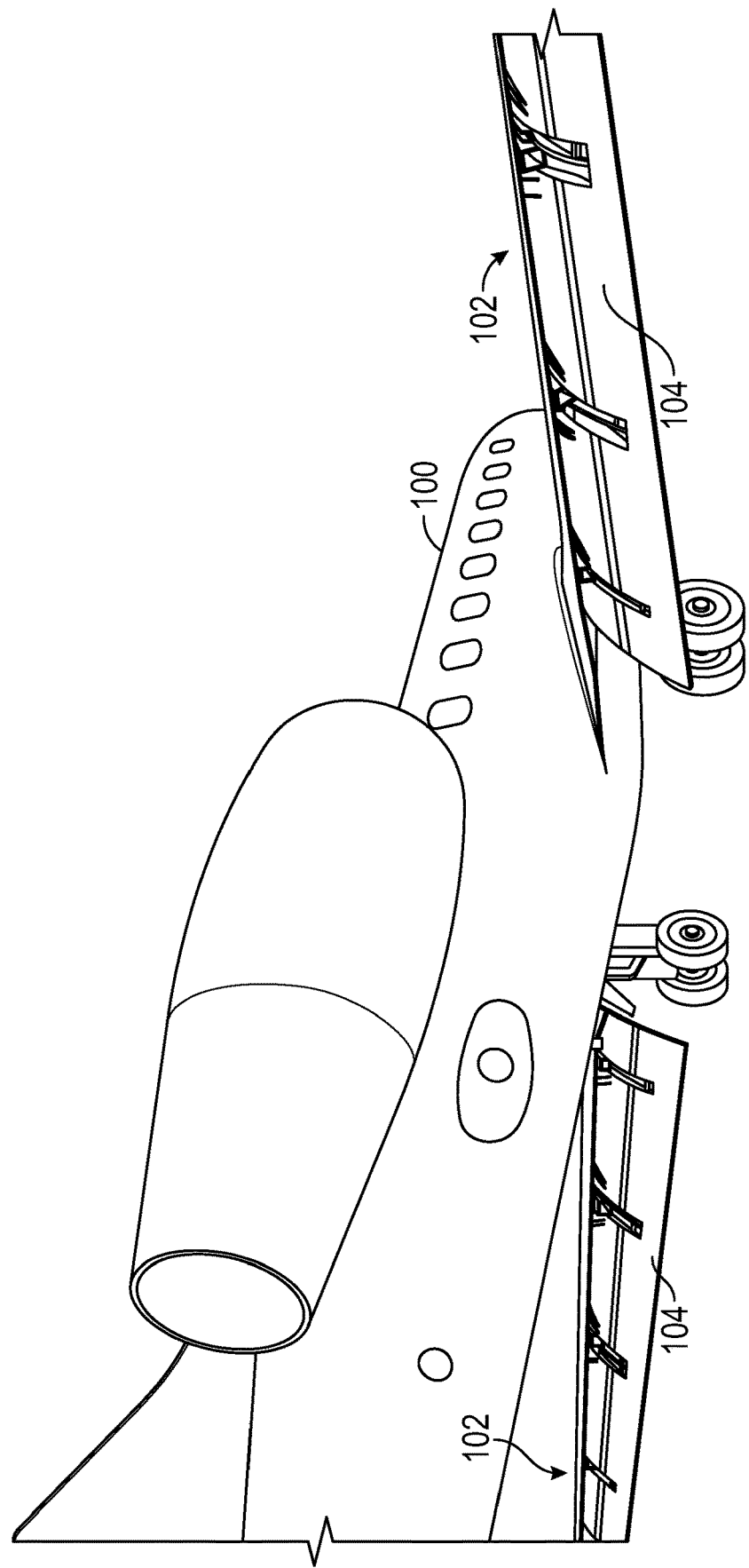
FIG. 1 is a rear perspective view of an aircraft with its moveable flaps deployed.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

A moveable control surface for a vehicle (and associated actuation assemblies and components) are disclosed herein. In accordance with certain non-limiting embodiments, the moveable control surface is deployed onboard an aircraft such as an airplane. However, it should be appreciated that embodiments of the disclosed subject matter can be utilized for other vehicle applications including, without limitation: trains; helicopters; automobiles; watercraft; submarines; monorails; amusement park rides; transportation systems; spacecraft; or the like. For the sake of brevity, conventional techniques related to aircraft control and actuation systems, moveable control surfaces such as flaps for an aircraft wing, and other functional aspects of certain components and assemblies may not be described in detail herein.

Figure 2:
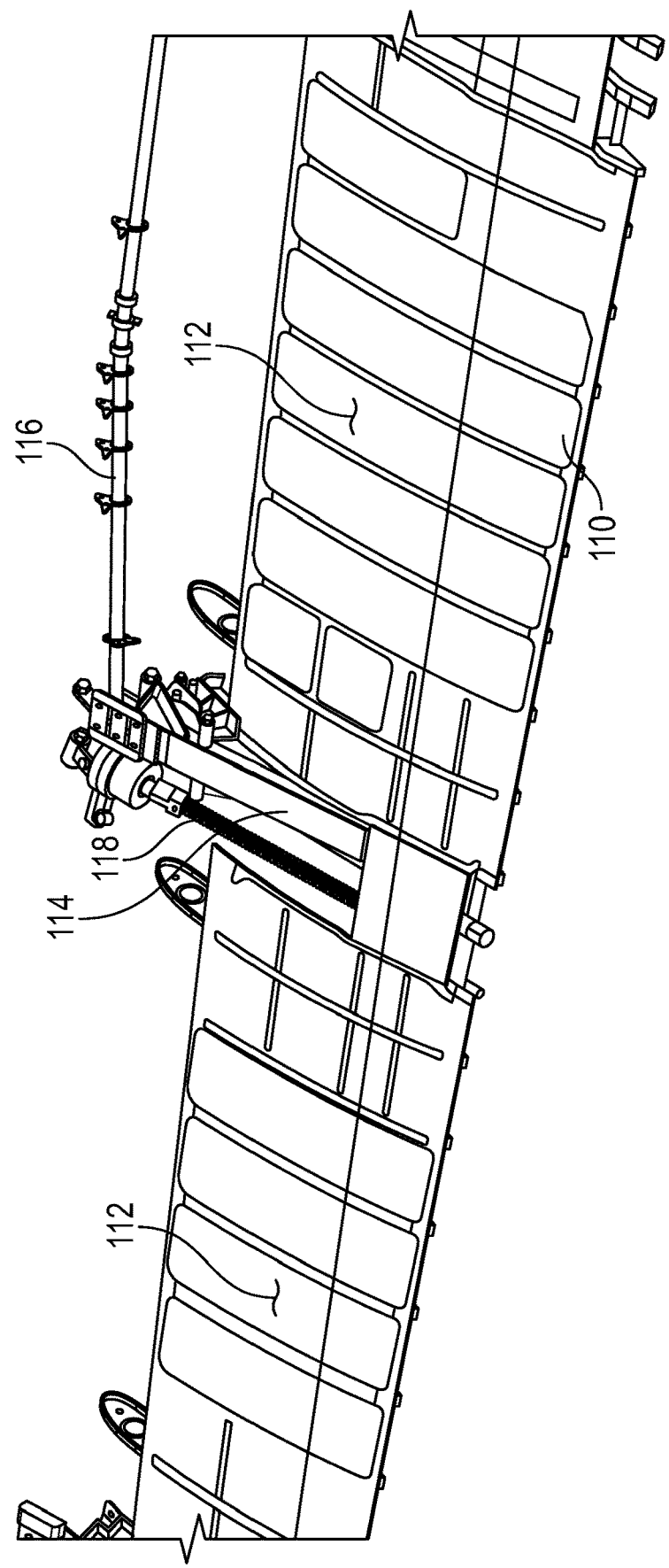
FIG. 2 is a perspective view of a portion of a moveable flap and associated components for deploying the moveable flap.

Turning now to the drawings, FIG. 1 is a rear perspective view of an aircraft 100. The aircraft has two wings 102, and each wing 102 has a respective moveable flap 104 (a control surface) movably coupled thereto. FIG. 1 depicts the aircraft with its moveable flaps 104 deployed (extended in the aft direction and angled slightly downward). FIG. 2 is a perspective view of a portion of a moveable control surface (e.g., a moveable flap 110) and associated components for deploying the moveable flap 110. In FIG. 2, some structure, features, and/or components have been removed (partially or entirely) to make it easier to view items that would otherwise be hidden from view. For example, a portion of the external skin 112 of the moveable flap 110 has been removed from the leading edge of the moveable flap 110. Moreover, FIG. 2 does not depict the wing of the aircraft (to which the moveable flap 110 is coupled), even though some of the components and structure shown in FIG. 2 are attached to, integrated with, or carried by structure of the wing.

The moveable flap 110 is supported by at least one track 114. FIG. 2 shows a portion of the moveable flap 110 and only one track 114. In certain embodiments, the aircraft includes four tracks 114 for each moveable flap 110. The track 114 is configured to be coupled to a structure of the aircraft in a fixed position relative to the structure. More specifically, the track 114 is coupled to the wing of the aircraft in a fixed position such that the moveable flap 110 moves (when actuated) relative to the track 114. The moveable flap 110 is actuated via at least one drive shaft 116 and at least one ball screw linear actuator 118. Operation of the drive shaft 116 causes the linear actuator 118 to rotate, which in turn causes the moveable flap 110 to move along the track 114.

Figure 3:
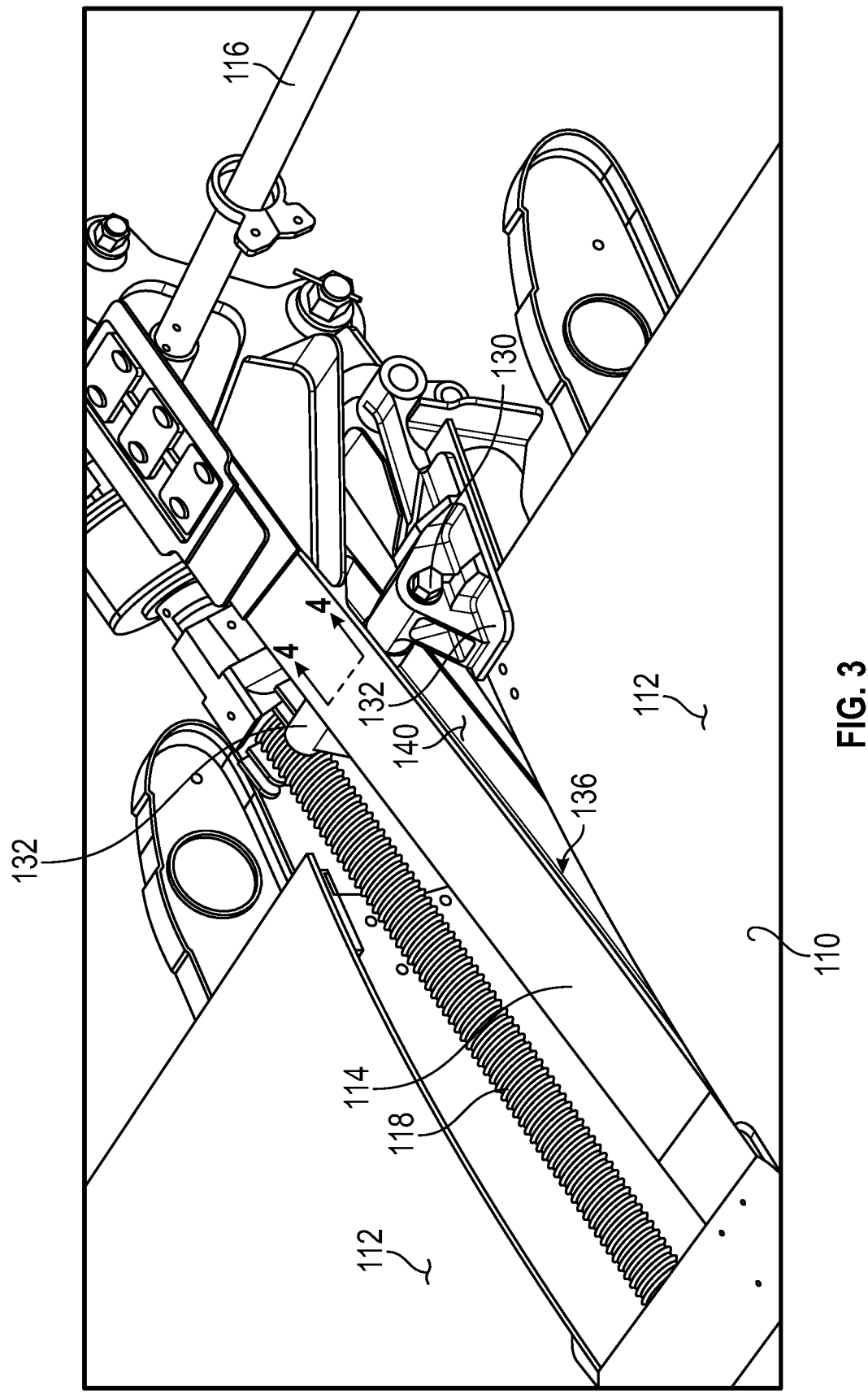
FIG. 3 is a perspective view that depicts aircraft components that cooperate to deploy a moveable flap.
Figure 4:
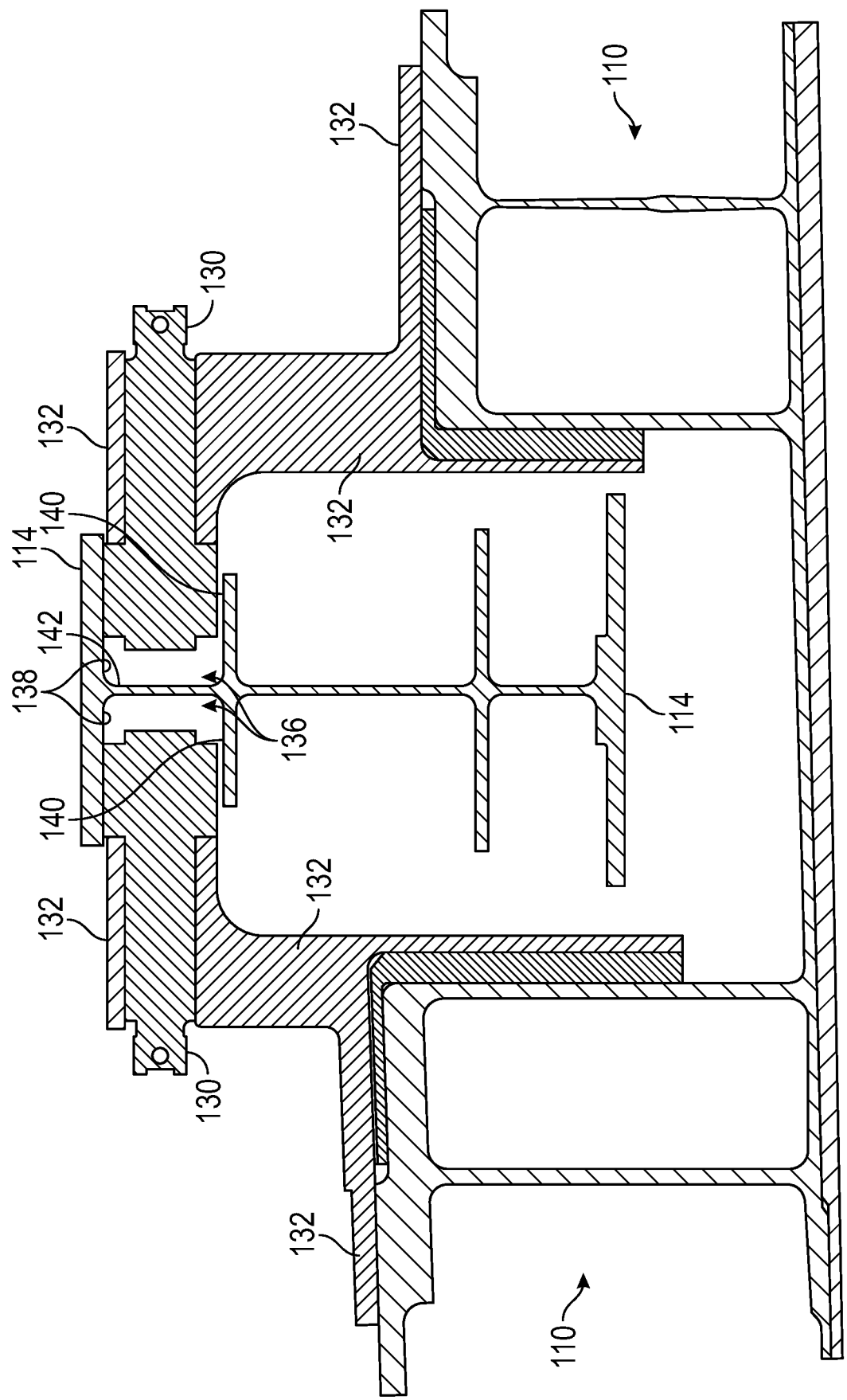
FIG. 4 is a longitudinal cross sectional view that schematically depicts some of the aircraft components shown in FIG. 3.

FIG. 3 is a perspective view that depicts aircraft components that cooperate to deploy the moveable flap 110, and FIG. 4 is a longitudinal cross sectional view that schematically depicts some of the aircraft components shown in FIG. 3. FIG. 3 corresponds to a more detailed view of some of the components shown in FIG. 2. In this regard, FIG. 3 shows the flap 110, the external skin 112, the track 114, a portion of the drive shaft 116, and the linear actuator 118 that also appear in FIG. 2. As mentioned above with reference to FIG. 2, some components, features, hardware, and/or portions thereof that would otherwise be visible in a deployment of the illustrated aircraft have been removed from FIG. 3 to provide an unobstructed view of underlying structure. FIG. 4 generally corresponds to a sectional view along the line 4-4 in FIG. 3.

Referring to FIGS. 2-4, the track 114 (which is implemented as a flap track for the illustrated embodiment) is a support structure that is shaped, sized, and configured to be coupled to a mounting structure of the aircraft. More specifically, the track 114 is coupled to mounting structure of the wing of the aircraft, and is held in a fixed position relative to the wing. The track 114 is assembled or fabricated from a strong and durable material, such as steel or aluminum, or from a combination of strong and durable materials.

Again, for clarity and ease of illustration, the wing and the aircraft mounting structure to which the track 114 is coupled are not shown in FIGS. 2-4. The moveable flap 110 is moveably coupled to the track 114 via at least one roller 130 and at least one roller fitting 132. Accordingly, the track 114 supports the moveable flap 110 while allowing the moveable flap 110 to move between a stowed position and a deployed position. To this end, the track 114 is suitably configured to accommodate at least one roller 130 during actuation of the moveable flap 110. The illustrated embodiment utilizes two rollers 130 per track 114, and movement of the rollers 130 is restrained or defined by the track 114. Each roller 130 is coupled to the moveable flap 110 by a respective roller fitting 132. The roller fittings 132 can be attached in a fixed position relative to the moveable flap 110. Alternatively, the roller fittings 132 may be integrated with the moveable flap 110 or otherwise implemented as part of the moveable flap 110.

The depicted embodiment of the track 114 includes two channels 136 (one for each roller 130). The channels 136 are aligned and oriented to generally correspond with the fore/aft direction of the aircraft. The orientation of the channels 136 accommodates the desired translation of the moveable flap 110. A channel 136 can be defined by an upper inner surface 138, a lower inner surface 140 opposing the upper inner surface 138, and a web 142 extending between the upper inner surface 138 and the lower inner surface 140 (see FIG. 4).

As shown in FIG. 4, a first portion of the roller 130 is mounted to the roller fitting 132, such that a second portion of the roller 130 is positioned outside of the roller fitting 132 to cooperate and engage with the track 114. As explained in more detail below, the roller 130 includes rolling elements (wheels or rollers) that are configured to engage and roll along different bearing surfaces of the track 114. In certain embodiments, the roller 130 includes: a primary roller that can roll along the upper inner surface 138 or the lower inner surface 140 (under appropriate operating conditions); and a secondary roller that can roll along the web 142 (under appropriate operating conditions).

During deployment or retraction of the moveable flap 110 (and also during flight when the moveable flap 110 is not being deployed or retracted), the moveable flap 110 can laterally shift and/or deflect by a small amount. Shifting or deflection of the moveable flap 110 can cause the rollers 130 to contact the upper inner surface 138, the lower inner surface 140, or the web 142. Deflection of the moveable flap 110 may also cause the two rollers 130 to move closer together or farther apart. The primary roller provides a low-friction engagement between the roller 130 and the upper inner surface 138, and between the roller 130 and the lower inner surface 140. This reduces wear and tear of these bearing surfaces of the track 114, and reduces wear and tear of the roller 130. The secondary roller provides a low-friction engagement between the end of the roller 130 and the web 142. This reduces wear and tear of the web 142 and the end of the roller 130. More specifically, the secondary roller prevents or reduces grinding, scrubbing, scraping, and damage that might otherwise be caused by the end of the roller 130. Instead, the secondary roller spins and glides along the web 142, and self-aligns to ensure a smooth low-friction engagement between the roller 130 and the web 142.

An embodiment of a roller 200 that is suitable for use with a moveable control surface of an aircraft (e.g., a moveable flap) will now be described with reference to FIGS. 5-15 and occasional reference to FIGS. 2-4. The roller 200 can be instantiated any number of times in an aircraft deployment. For example, an aircraft having two wing flaps, four flap tracks per wing, and two flap rollers per track will include sixteen rollers 200. Of course, the number of rollers 200 utilized in a particular application can vary as needed for compatibility with the intended arrangement.

Figure 5:
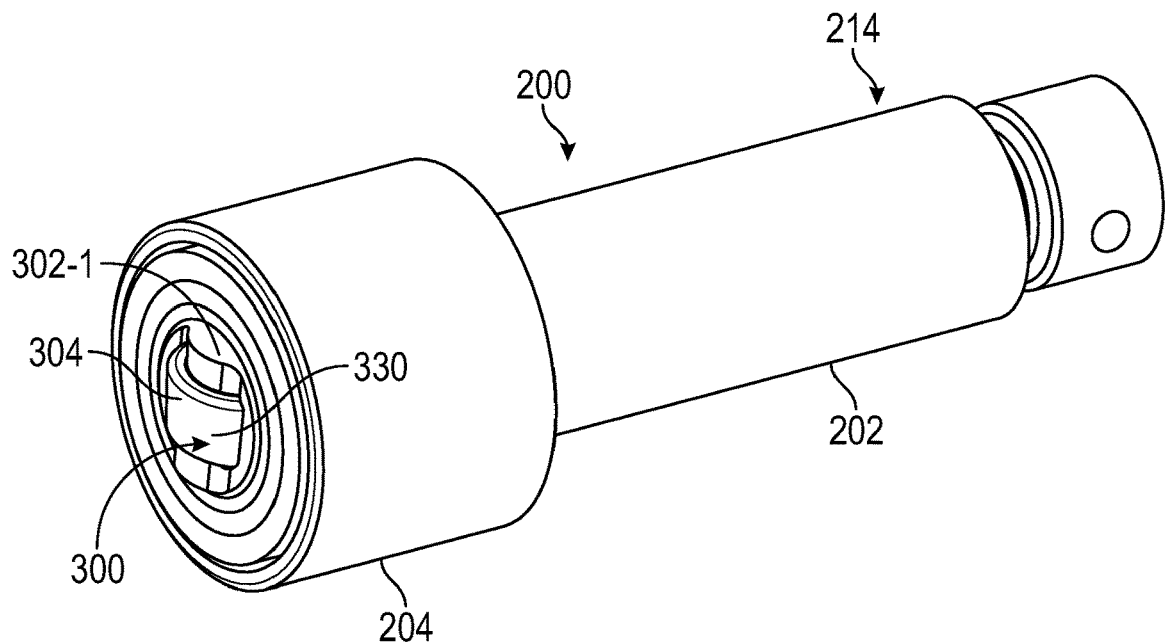
FIG. 5 is a perspective view of a roller configured in accordance with certain embodiments of the invention.
Figure 6:
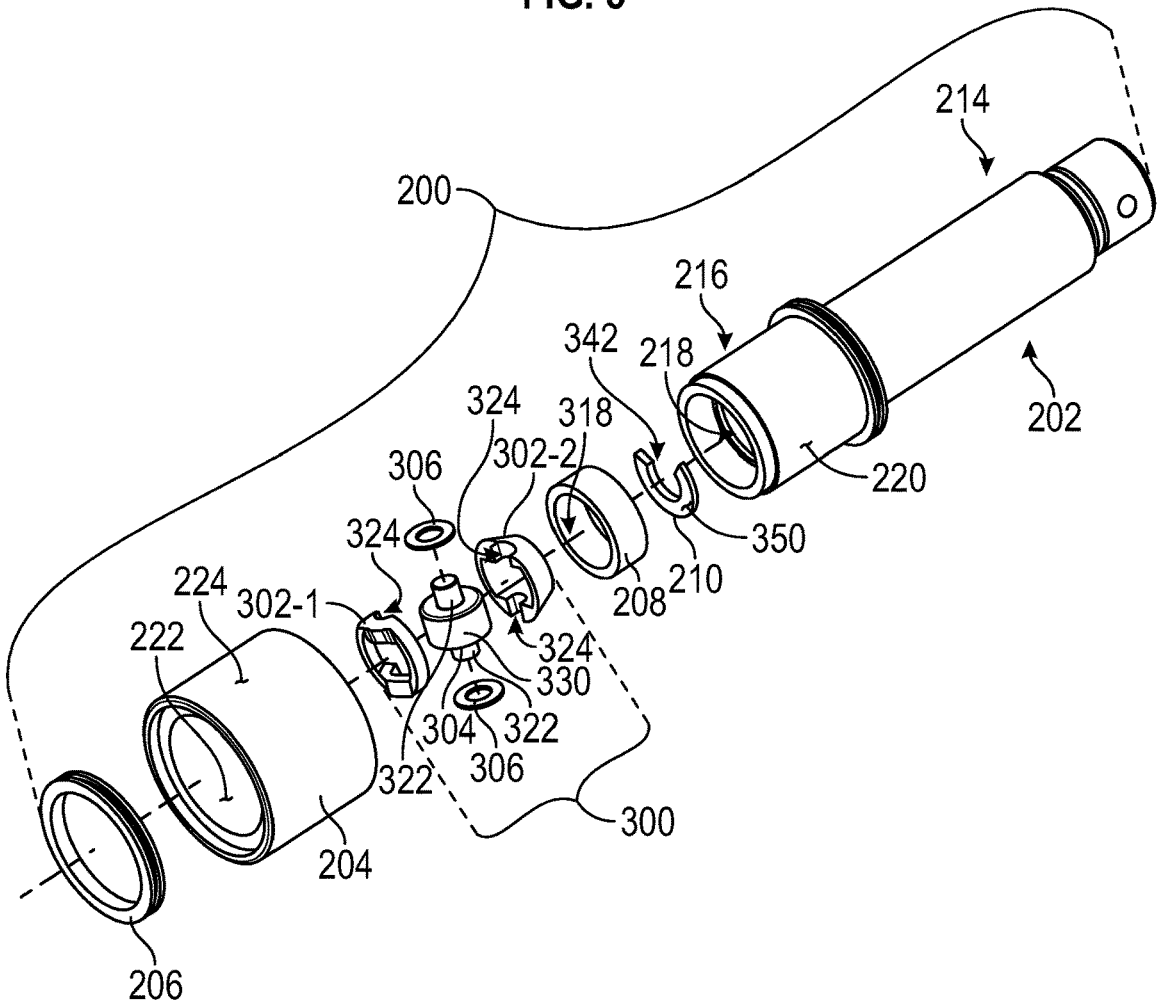
FIG. 6 is an exploded perspective view of the roller shown in FIG. 5.
Figure 7:
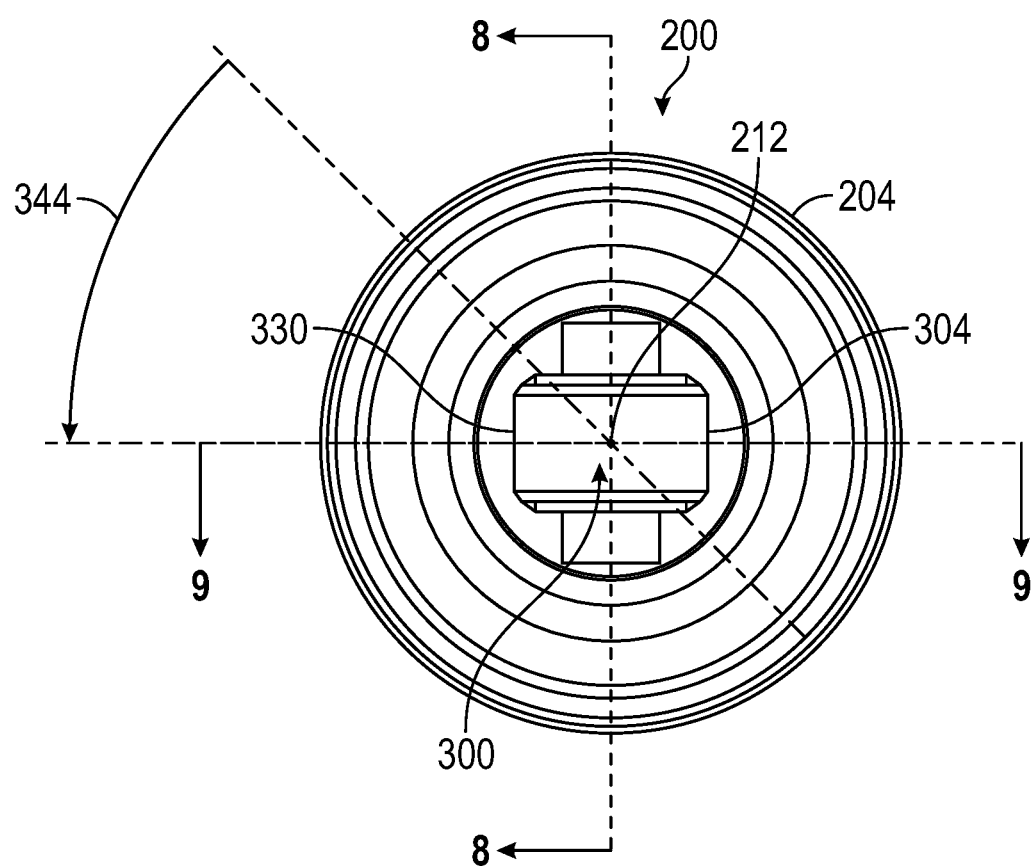
FIG. 7 is a front view of the roller shown in FIG. 5.
Figure 8:
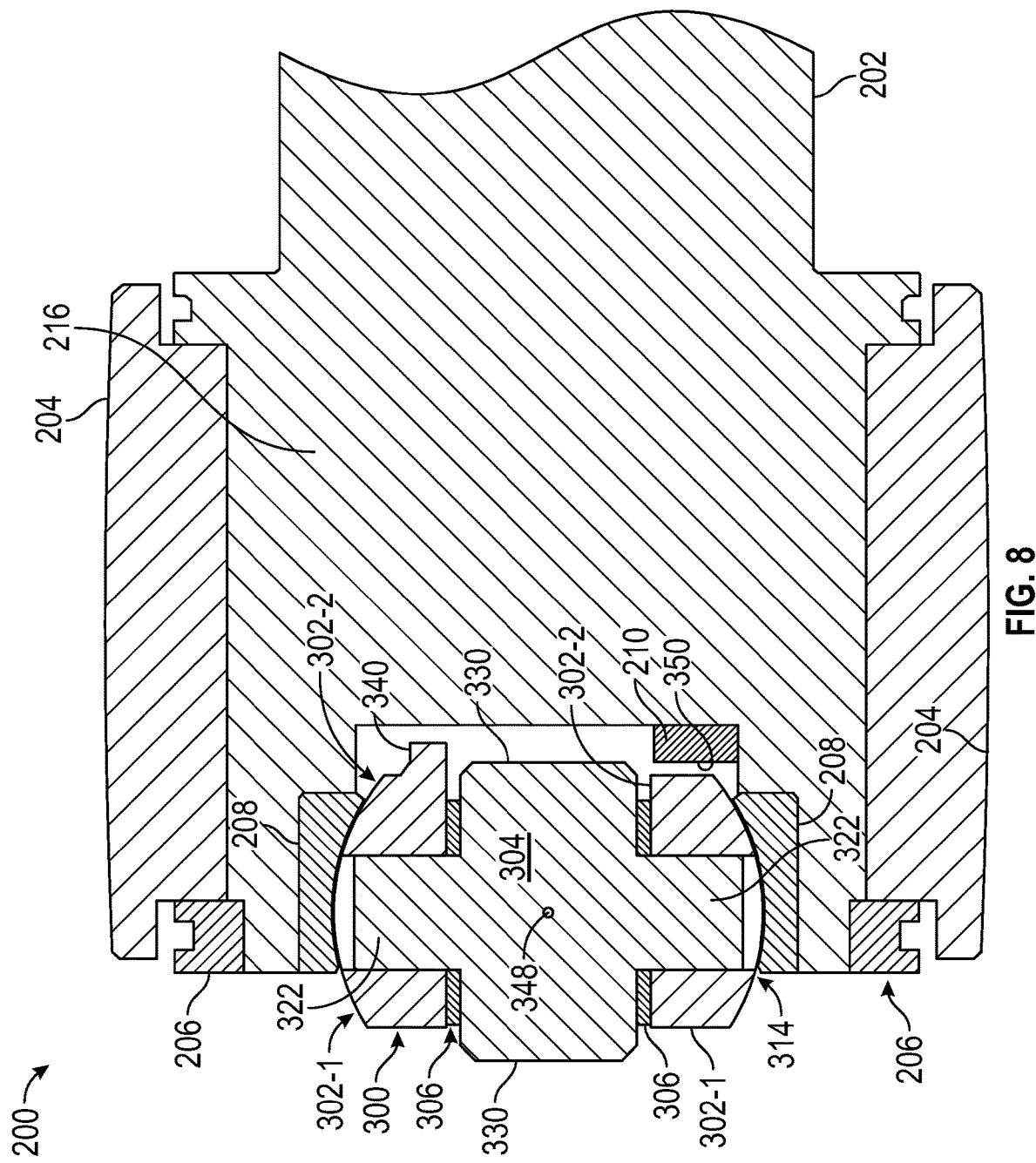
FIG. 8 is a cross sectional view of a portion of the roller as viewed along the line 8-8 in FIG. 7.
Figure 9:
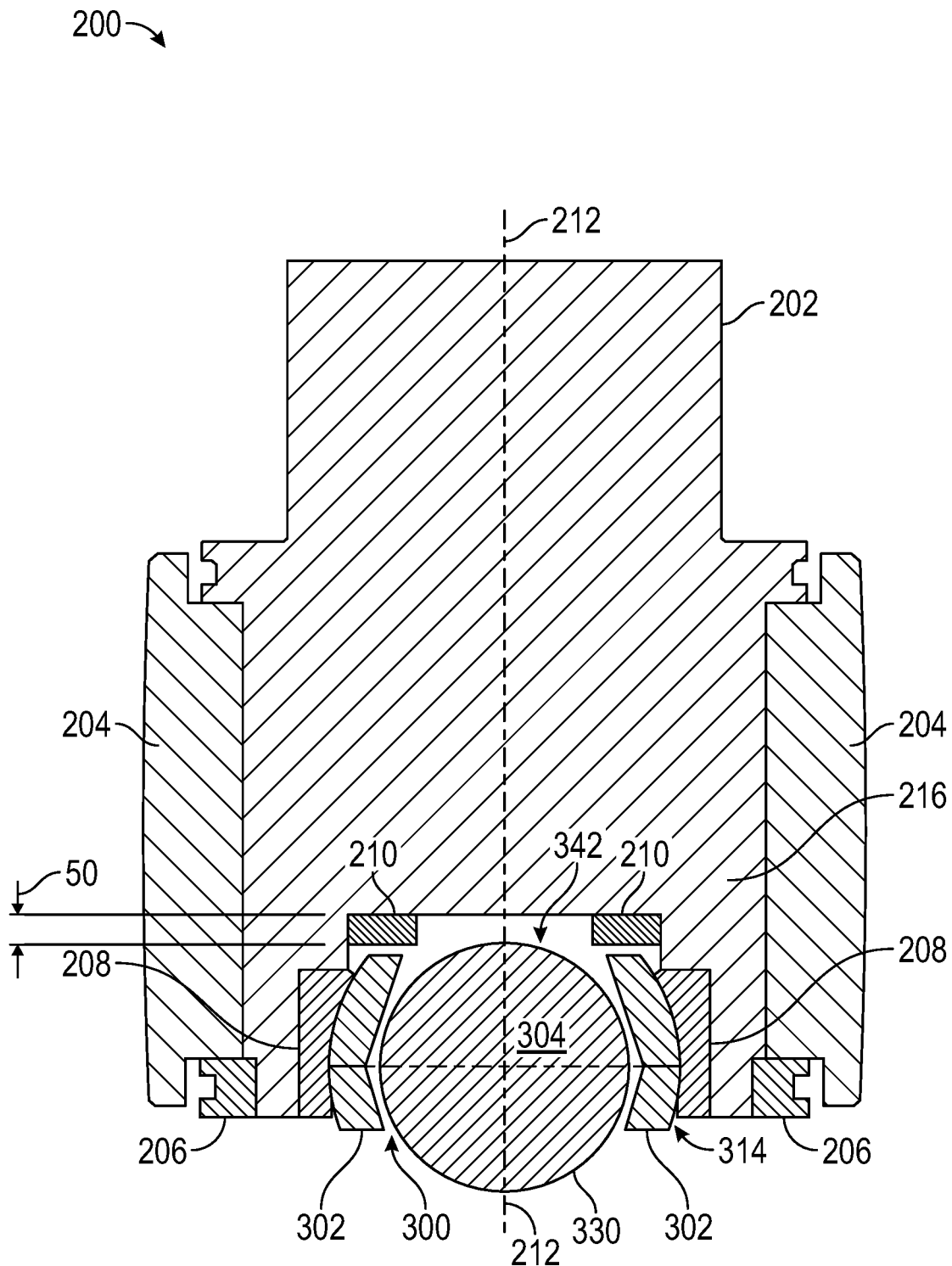
FIG. 9 is a cross sectional view of a portion of the roller as viewed along the line 9-9 in FIG. 7.
Figure 10:
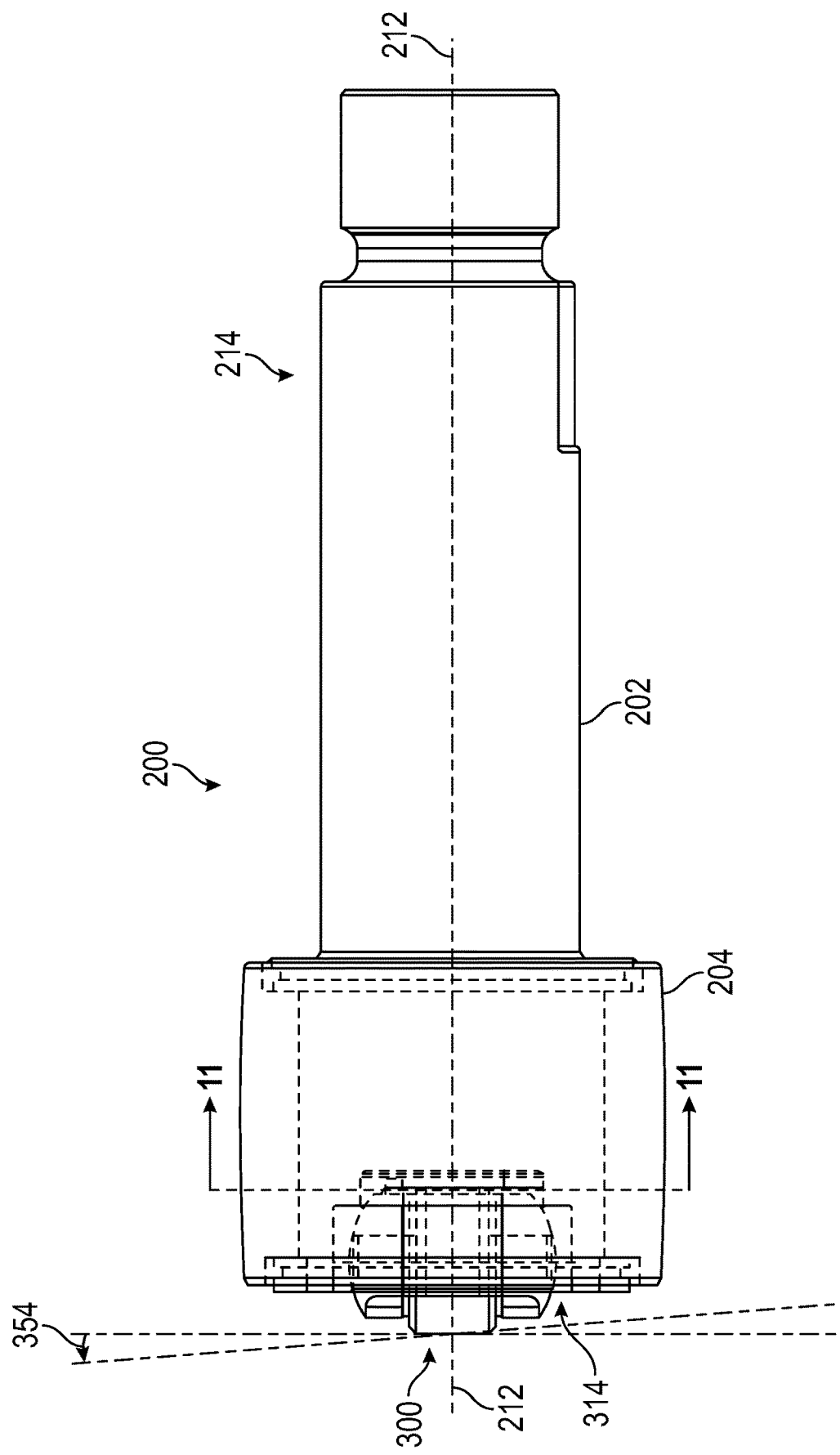
FIG. 10 is a side view of the roller shown in FIG. 5.
Figure 11:
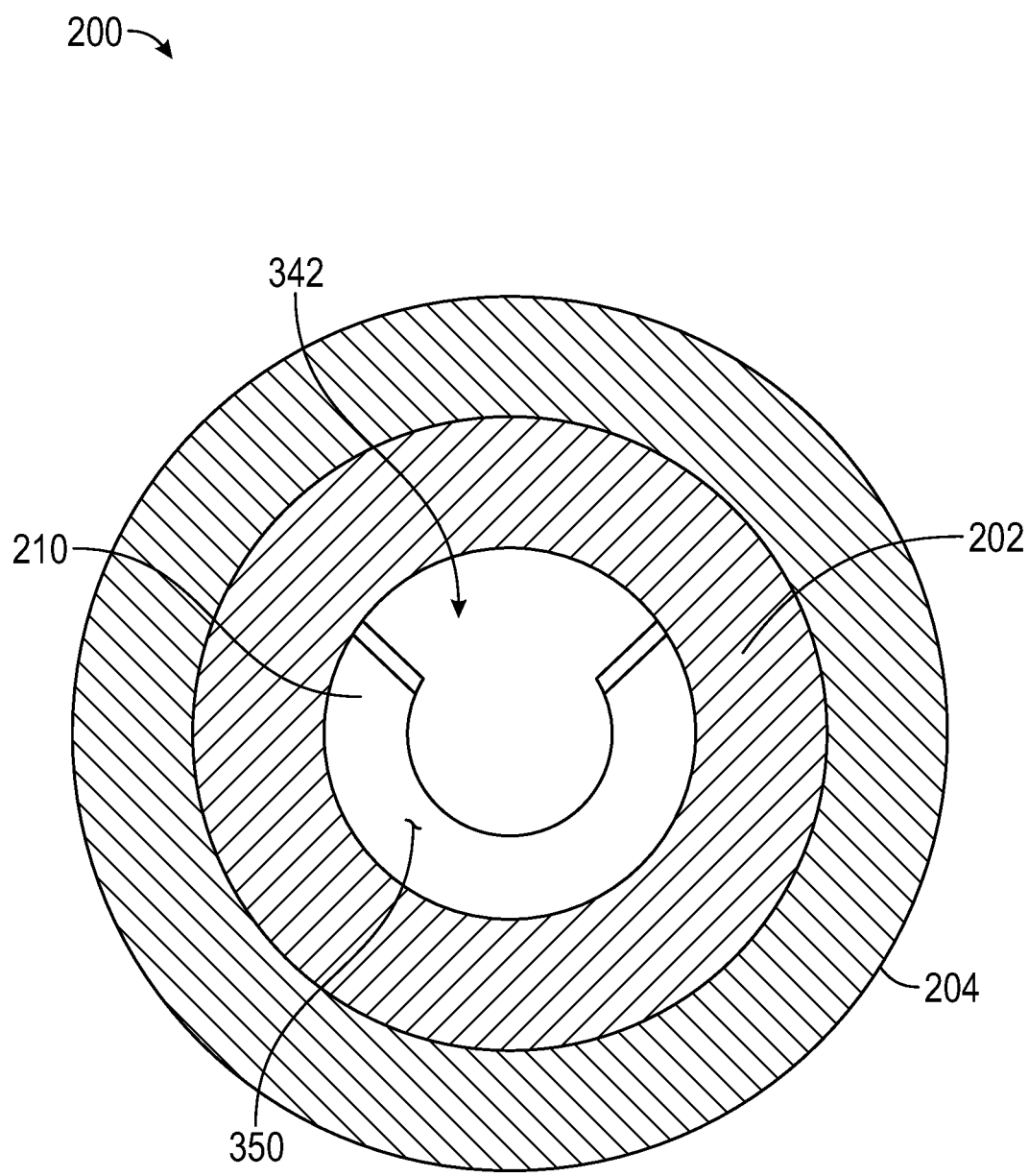
FIG. 11 is a cross sectional view of the roller as viewed along the line 11-11 in FIG. 10.
Figure 12:
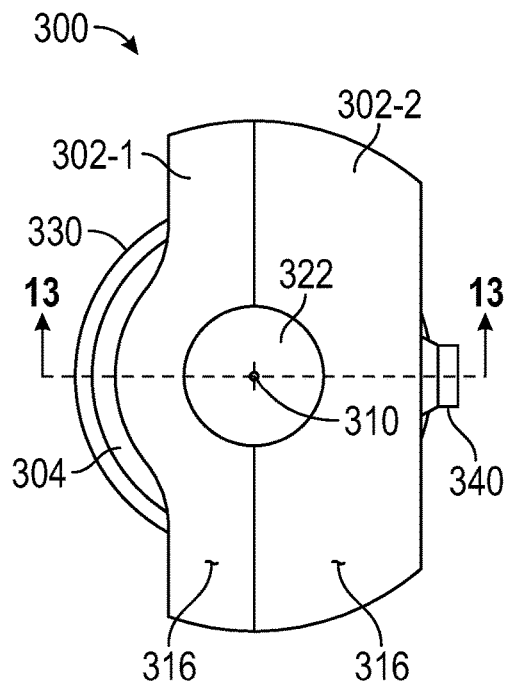
FIG. 12 is a top view of a roller assembly configured in accordance with certain embodiments of the invention.
Figure 13:
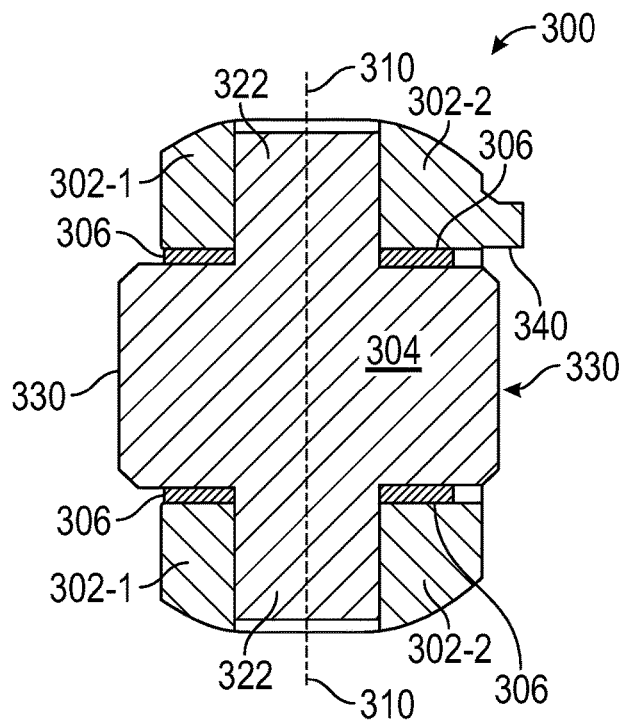
FIG. 13 is a cross sectional view of the roller assembly as viewed along the line 13-13 in FIG. 12.
Figure 14:
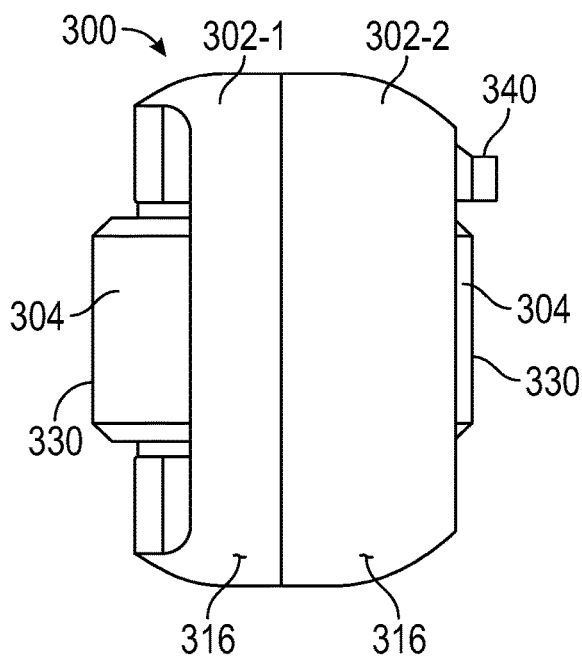
FIG. 14 is a side view of the roller assembly shown in FIG. 12.
Figure 15:
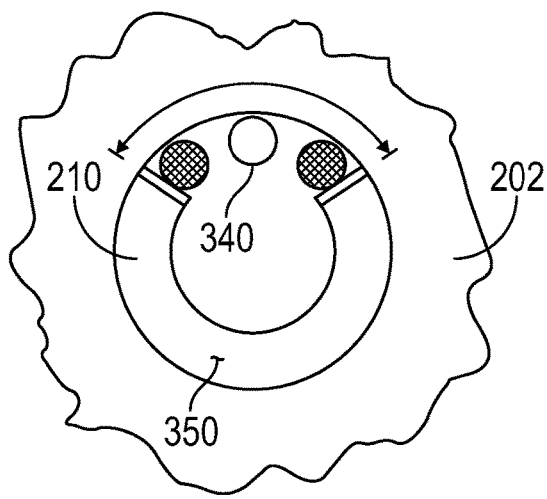
FIG. 15 is a diagram that illustrates a rotation limiter cooperating with a feature of a roller assembly, in accordance with certain embodiments of the invention.

FIG. 5 is a perspective view of the roller 200, FIG. 6 is an exploded perspective view of the roller 200, FIG. 7 is a front view of the roller 200, FIG. 8 is a cross sectional view of a portion of the roller 200 as viewed along the line 8-8 in FIG. 7, FIG. 9 is a cross sectional view of a portion of the roller 200 as viewed along the line 9-9 in FIG. 7, FIG. 10 is a side view of the roller 200, and FIG. 11 is a cross sectional view of the roller as viewed along the line 11-11 in FIG. 10. FIG. 12 is a top view of a roller assembly 300 configured in accordance with certain embodiments of the invention, FIG. 13 is a cross sectional view of the roller assembly 300 as viewed along the line 13-13 in FIG. 12, FIG. 14 is a side view of the roller assembly 300, and FIG. 15 is a diagram that illustrates a rotation limiter cooperating with a feature of the roller assembly 300.

The illustrated embodiment of the roller 200 includes, without limitation: a roller shaft 202; a primary roller 204; the roller assembly 300; a retaining component 206; an outer bearing race 208; and a rotation limiter 210. These components (and the components that form the roller assembly 300) can be assembled or fabricated from any suitable and appropriate material, combination of materials, or composite material. For example, the components of the roller 200 may include or be fabricated from a strong, tough, and durable material such as steel, aluminum, a carbon graphite composite material, or a plastic material, without limitation. The components of the roller 200 can be machined, molded, 3-D printed, welded or bonded, etc. Individual components of the roller 200 can be assembled using any suitable technique, technology, or process (including, without limitation: welding, bonding, swaging, press-fitting, connecting via a threaded engagement, snap-fitting, retaining clips, fasteners).

The roller shaft 202 is the primary supporting structure of the roller 200. The roller shaft 202 includes, without limitation: a central longitudinal shaft axis 212 (see FIG. 9 and FIG. 10); a mounting end 214 that is configured to couple with a roller fitting 132 of a moveable control surface (e.g., the moveable flap 110); a roller end 216 opposite the mounting end 214; and a cavity 218 formed within the roller end 216 (see FIG. 6). The mounting end 214 is shaped, sized, and configured to mate with the roller fitting 132 in a desired orientation and rotational alignment. For example, the mounting end 214 may include splines, a clocking feature, nubs, or threads to ensure that it is properly oriented, aligned, and installed within the roller fitting 132. The roller shaft 202 can be secured to the roller fitting 132 in the desired position using one or more fasteners, retaining clips, cotter pins, or the like.

The primary roller 204 (which resembles a wheel) is coupled to the roller end 216 of the roller shaft 202 in a manner that allows it to spin freely. Thus, the primary roller 204 and the roller end 216 are cooperatively configured to allow the primary roller 204 to rotate about the longitudinal shaft axis 212. In certain embodiments, the roller end 216 includes or defines a smooth cylindrical outer bearing surface 220 that cooperates with a smooth cylindrical inner bearing surface 222 of the primary roller 204 (see FIG. 6). These bearing surfaces 220, 222 can be treated with a low friction coating and/or lubricant to enable the primary roller 204 to rotate smoothly and easily around the roller end 216. The primary roller 204 also includes or defines a primary cylindrical outer bearing surface 224 that is shaped, sized, and otherwise configured for compatibility with the track 114. In this regard, the primary roller 204 (in particular, the primary cylindrical outer bearing surface 224) is suitably configured to engage and roll along one or more bearing surfaces of the track 114 (e.g., the upper inner surface 138 of the track 114 and/or the lower inner surface 140 of the track 114). The retaining component 206 is coupled to the roller end 216 of the roller shaft 202 to retain the primary roller 204 on the roller shaft 202. The retaining component 206 can be attached to the roller end 216 by press-fitting, bonding or welding, a threaded engagement, snap-fitting, or the like.

The rotation limiter 210 and its functionality are described in more detail below. For the depicted embodiment, the rotation limiter 210 is located in the cavity 218 and is held in a desired orientation and fixed position relative to the roller shaft 202. FIG. 8 and FIG. 9 show the rotation limiter 210 (in cross section) positioned deep within the cavity 218. More specifically, the rotation limiter 210 abuts the back wall of the cavity 218. In alternative embodiments, the rotation limiter 210 can be realized as an integral feature or physical characteristic of the roller shaft 202. For example, the desired physical shape, dimensions, and characteristics of the rotation limiter 210 can be machined, molded, or otherwise fabricated into the cavity 218.

The roller assembly 300 is coupled to the roller end 216 of the roller shaft 202. In certain embodiments, the roller assembly 300 is coupled to the roller end 216 via the outer bearing race 208 (see FIG. 8 and FIG. 9). During assembly of the roller 200, the outer bearing race 208 is secured to the roller assembly 300 in a manner that allows the roller assembly 300 to rotate, pivot, and spin within the outer bearing race 208. For example, the outer bearing race 208 can be initially formed to readily accommodate insertion/placement of the roller assembly 300, and further processed, machined, and/or treated to secure the roller assembly 300 in place. To this end, the original shape of the outer bearing race 208 can be altered by swaging, bending, and/or machining as needed. Thereafter, the outer bearing race 208 (which carries the roller assembly 300) is inserted into the cavity 218. The outer bearing race 208 is secured to the roller end 216 of the roller shaft 202 by way of spot welding, bonding, press-fitting, threading, or the like. After installation, the outer bearing race 208 at least partially resides within the cavity 218. In accordance with the illustrated embodiment, the outer bearing race 208 abuts a shoulder defined within the cavity 218 to register the location of the outer bearing race 208 and maintain its position relative to the end of the roller shaft 202 (see FIG. 8 and FIG. 9).

The embodiment of the roller assembly 300 presented here includes, without limitation: a housing 302; a secondary roller 304; and washers 306 (see FIG. 6). The illustrated embodiment of the housing 302 is a two-part assembly, where housing 302-1 and housing 302-2 are coupled together to surround and retain the secondary roller 304 and the washers 306. The housings 302-1, 302-2 can be coupled together by bonding, welding, press-fitting, snap-fitting, or the like. The housing 302 retains the secondary roller 304 while allowing the secondary roller 304 to rotate about its longitudinal roller axis 310 (see FIG. 12 and FIG. 13—the longitudinal roller axis 310 is depicted as a point in FIG. 12). Moreover, the housing 302 is movably coupled to the roller end 216 of the roller shaft 202 (via the outer bearing race 208) with three degrees of rotational freedom relative to the roller end 216. For this particular embodiment, the outer bearing race 208 retains and supports the housing 302 to accommodate the three degrees of rotational freedom. As shown in FIGS. 8-10, the outer bearing race 208 and the housing 302 cooperate to form a ball and socket joint 314 that allows the roller assembly 300 to rotate, pivot, and spin relative to the outer bearing race 208 (and relative to the roller shaft 202). To this end, the housing 302 has an outer bearing surface 316 (see FIGS. 12-14) that is shaped, sized, and configured to cooperate with a corresponding inner bearing surface 318 (see FIG. 6) of the outer bearing race 208. In accordance with the depicted embodiment, the outer bearing surface 316 includes a spherical surface that matches a spherical surface of the inner bearing surface 318.

The secondary roller 304 includes or cooperates with an axle 322 that corresponds to the longitudinal roller axis 310 (the axle is shown in FIGS. 6, 8, 12, and 13). The secondary roller 304 is coupled within the housing 302 in a manner that allows it to freely rotate about its longitudinal roller axis 310. In certain embodiments, the housing 302 includes an axle channel 324 (see FIG. 6) defined therein to retain and support the axle 322. A portion of the axle channel 324 is defined in the housing 302-1, and another portion of the axle channel 324 is defined in the housing 302-2. The washers 306 are installed onto the two ends of the axle 322 before the housings 302-1, 302-2 are coupled together. The axle channel 324 and the axle 322 are shaped, sized, and configured to enable the axle 322 to rotate within the axle channel 324 about the longitudinal roller axis 310. These bearing surfaces of the axle 322 and the axle channel 324 can be treated with a low friction coating and/or lubricant to enable the secondary roller 304 to rotate smoothly and easily within the housing 302.

The secondary roller 304 includes or defines a secondary cylindrical outer bearing surface 330 that is shaped, sized, and otherwise configured for compatibility with a bearing surface of the track 114. In this regard, the secondary roller 304 (in particular, the secondary cylindrical outer bearing surface 330) is suitably configured to engage and roll along one or more bearing surfaces of the track 114 (e.g., the web 142 of the track 114 as shown in FIG. 4). Thus, the secondary roller 304 is designed to engage and roll along a surface of the track 114 that is different than the surface(s) that engage the primary roller 204. As best shown in FIGS. 5, 8, 9, and 10, the roller assembly 300 is coupled to the roller end 216 of the roller shaft 202 in a position such that at least a portion of the secondary cylindrical outer bearing surface 330 extends from the roller end 216. Accordingly, as the secondary roller 304 spins within the housing 302, at least some of the secondary cylindrical outer bearing surface 330 remains exposed and positioned beyond the end of the roller shaft 202 (as clearly depicted in FIG. 8). This arrangement ensures that the secondary cylindrical outer bearing surface 330 can contact and engage the web 142 as needed.

As mentioned above, the ball and socket joint 314 formed by the outer bearing race 208 and the housing 302 provides three degrees of rotational freedom. In certain embodiments, however, rotation of the housing 302 relative to the roller shaft 202 is restricted or limited in at least one rotational direction. The roller 200 may include or cooperate with one or more components, integral features or characteristics, and/or elements that mechanically limit the range of rotation of the housing 302, which in turn limits the range of rotation of the secondary roller 304 relative to the roller shaft 202.

Referring to FIGS. 6-8 and 11-15, the roller 200 may include or cooperate with a suitably configured means for limiting rotation of the housing 302 in at least one direction, or about at least one axis of rotation. In accordance with the illustrated embodiment, the means for limiting rotation includes, without limitation: the rotation limiter 210 and a projection 340, which may be integrated in or coupled to the housing 302. The rotation limiter 210 has an opening 342 defined therein, which is shaped, sized, and configured to accommodate the projection 340. As shown in FIGS. 8 and 15, the projection 340 extends into the opening 342 of the rotation limiter 210 when the roller assembly 300 is installed onto the roller shaft 202. Notably, the opening 342 is dimensioned to define a range of motion (rotation) of the projection 340, such that the rotation limiter 210 inhibits rotation of the housing about the longitudinal shaft axis 212. FIG. 15 schematically depicts the range of rotational travel of the projection 340, wherein the shaded circles represent the two limits of rotational travel as physically defined by the rotation limiter 210. Although the limits of rotation may vary from one embodiment to another, the example shown in FIG. 15 contemplates a range of ±45 degrees from top dead center. FIG. 7 indicates the limited range 344 of the roller assembly 300, which corresponds to a counterclockwise rotation of 45 degrees (from top dead center). Although not depicted in FIG. 7, the roller assembly 300 has a similar limited range that corresponds to a clockwise rotation of 45 degrees.

Alternatively or additionally, the means for limiting rotation may include one or more features, components, or elements that cooperate to inhibit rotation of the housing about a normal axis that is perpendicular to the longitudinal shaft axis 212. Referring to FIG. 7, a "normal axis" in this context can be visualized as any line in the plane of the drawing sheet that intersects the longitudinal shaft axis 212 (rendered as a point in FIG. 7). In FIG. 8, a normal axis 348 corresponds to a point passing through the center of the secondary roller 304. For the illustrated embodiment, the means for limiting rotation includes, without limitation, the rotation limiter 210 and an outer surface, feature, or section of the housing 302. In such an embodiment, the outer surface, feature, or section of the housing 302 is configured to engage an outer surface 350 (see FIGS. 6, 8, 11, and 15) of the rotation limiter 210 to inhibit rotation of the housing 302 about an axis that is normal to the longitudinal shaft axis 212. As an example, with reference to FIG. 8, counterclockwise rotation of the roller assembly 300 (about the normal axis 348) is hard limited when the bottom of the housing 302 contacts the outer surface 350 of the rotation limiter 210. The shape, configuration, and location of the rotation limiter 210 (relative to the housing 302) cooperate to inhibit over-rotation of the housing 302 regardless of the angular position of the projection 340—see FIG. 11, which shows the outer surface 350 of the rotation limiter 210 continuously spanning a range of about 2:00 to about 10:00.

FIG. 10 schematically depicts the range of rotational travel of the roller assembly 300 relative to a vertical plane that is perpendicular to the drawing sheet. Although the limits of rotation may vary from one embodiment to another, the example shown in FIG. 10 contemplates a range of ±5 degrees from vertical. FIG. 10 indicates this limited range 354 of the roller assembly 300, which corresponds to a counterclockwise rotation of 5 degrees. Although not depicted in FIG. 10, the roller assembly 300 has a similar limited range that corresponds to a clockwise rotation of 5 degrees.

As described above, the means for limiting rotation may be embodied by the rotation limiter 210, the projection 340, and/or one or more features or characteristics of the roller assembly 300, such as an outer surface feature or element of the housing 302. Alternatively or additionally, the means for limiting rotation may include or be embodied by a suitably configured structural feature of the roller shaft 202.

As mentioned above, the roller assembly 300 has three degrees of rotational freedom that allow it to pivot and rotate as needed. This freedom enables the roller assembly 300 (and, therefore, the secondary roller 304) to self-align when in contact with the web 142 of the track 114. The rotation limiter 210 establishes limited ranges of rotation to increase the likelihood that the secondary roller 304 will be properly aligned as it rolls along the web 142. In practice, the end of the roller 200 can be slightly misaligned relative to the bearing surface of the web 142. Nonetheless, the roller assembly 300 functions like a caster wheel that self-aligns in response to contact with, and motion relative to, the web 142. The rotation limiter 210 also prevents or inhibits physical contact between the web 142 and the housing 302 of the roller assembly 300, such that only the contact surface of the secondary roller 304 makes contact with the web 142. Furthermore, during deployment and retraction of the moveable flap 110, it moves in the fore/aft directions and pivots up/down. The roller assembly 300 and its self-aligning characteristics ensure that the secondary roller 304 is maintained in a proper orientation for efficient rolling in the desired direction during deployment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A roller for a moveable control surface of an aircraft, the moveable control surface having a roller fitting to accommodate the roller, and the aircraft having a track to accommodate the roller during actuation of the moveable control surface, the roller comprising:
   a roller shaft comprising:
      a longitudinal shaft axis;
      a mounting end configured to couple with the roller fitting of the moveable control surface; and
      a roller end opposite the mounting end, the roller end having a cavity formed therein;
   a primary roller coupled to the roller end of the roller shaft and configured to rotate about the longitudinal shaft axis, the primary roller configured to engage and roll along a first surface of the track;
   a roller assembly coupled to the roller end of the roller shaft, the roller assembly comprising:
      a secondary roller comprising a longitudinal roller axis, the secondary roller configured to engage and roll along a second surface of the track; and a housing that retains the secondary roller while allowing the secondary roller to rotate about the longitudinal roller axis, wherein the housing is movably coupled to the roller end of the roller shaft with three degrees of rotational freedom relative to the roller end of the roller shaft; and
an outer bearing race at least partially residing within the cavity, wherein the outer bearing race retains and supports the housing of the roller assembly to accommodate the three degrees of rotational freedom.

2. The roller of claim 1, wherein:
the track comprises a channel defined by an upper inner surface, a lower inner surface opposing the upper inner surface, and a web extending between the upper inner surface and the lower inner surface;
the first surface of the track corresponds to the upper inner surface or the lower inner surface; and
the second surface of the track corresponds to the web.

3. The roller of claim 1, wherein:
the primary roller comprises a primary cylindrical outer bearing surface that engages and rolls along the first surface of the track; and
the secondary roller comprises a secondary cylindrical outer bearing surface that engages and rolls along the second surface of the track.

4. The roller of claim 3, wherein the roller assembly is coupled to the roller end of the roller shaft in a position such that at least a portion of the secondary cylindrical outer bearing surface extends from the roller end of the roller shaft.

5. The roller of claim 1, further comprising a retaining component coupled to the roller end of the roller shaft to retain the primary roller on the roller shaft.

6. The roller of claim 1, wherein:
the secondary roller comprises an axle corresponding to the longitudinal roller axis;
the housing comprises an axle channel defined therein to retain and support the axle; and
the axle is configured to rotate within the axle channel about the longitudinal roller axis.

7. The roller of claim 1, wherein the outer bearing race and the housing of the roller assembly cooperate to form a ball and socket joint.

8. The roller of claim 1, wherein:
the housing of the roller assembly comprises an outer bearing surface to cooperate with an inner bearing surface of the outer bearing race; and
the outer bearing surface of the housing comprises a spherical surface.

9. The roller of claim 1, further comprising means for limiting rotation of the housing in at least one direction.

10. The roller of claim 9, wherein the means for limiting rotation comprises:
a rotation limiter located in the cavity, the rotation limiter having an opening defined therein; and
a projection integrated in or coupled to the housing, the projection extending into the opening of the rotation limiter, wherein the opening defines a range of motion of the projection such that the rotation limiter inhibits rotation of the housing about the longitudinal shaft axis.

11. The roller of claim 9, wherein the means for limiting rotation comprises a rotation limiter located in the cavity, wherein an outer surface of the housing is configured to engage an outer surface of the rotation limiter to inhibit rotation of the housing about a normal axis that is perpendicular to the longitudinal shaft axis.

12. A roller assembly for an aircraft having a moveable control surface, the roller assembly comprising:
a roller fitting configured to be coupled to the moveable control surface;
a track comprising a first bearing surface and a second bearing surface, the track configured to be coupled to a structure of the aircraft in a fixed position relative to the structure; and
a roller comprising:
a roller shaft comprising:
a longitudinal shaft axis;
a mounting end configured to couple with the roller fitting; and
a roller end opposite the mounting end;
a primary roller coupled to the roller end of the roller shaft and configured to rotate about the longitudinal shaft axis, the primary roller configured to engage and roll along the first bearing surface of the track; and
a roller assembly coupled to the roller end of the roller shaft, the roller assembly comprising:
a secondary roller comprising a longitudinal roller axis, the secondary roller configured to engage and roll along the second bearing surface of the track; and
a housing that retains the secondary roller while allowing the secondary roller to rotate about the longitudinal roller axis, wherein the housing is movably coupled to the roller end of the roller shaft with three degrees of rotational freedom relative to the roller end of the roller shaft;
wherein the track comprises a channel defined by an upper inner surface, a lower inner surface opposing the upper inner surface, and a web extending between the upper inner surface and the lower inner surface;
wherein the first bearing surface of the track corresponds to the upper inner surface or the lower inner surface; and
wherein the second bearing surface of the track corresponds to the web.

13. The roller assembly of claim 12, further comprising:
a cavity formed within the roller end of the roller shaft; and
an outer bearing race at least partially residing within the cavity, wherein the outer bearing race retains and supports the housing of the roller assembly to accommodate the three degrees of rotational freedom.

14. The roller assembly of claim 12, further comprising means for limiting rotation of the housing about at least one axis of rotation.

15. An aircraft comprising:
a wing;
a control surface movably coupled to the wing;
a roller fitting coupled to the control surface;
a track comprising a first bearing surface and a second bearing surface, the track coupled to the wing in a fixed position relative to the wing; and
a roller comprising:
a roller shaft comprising:
a longitudinal shaft axis;
a mounting end coupled to the roller fitting; and
a roller end opposite the mounting end, the roller end having a cavity formed therein;
a primary roller coupled to the roller end of the roller shaft and configured to rotate about the longitudinal shaft axis, the primary roller configured to engage and roll along the first bearing surface of the track;

a roller assembly coupled to the roller end of the roller shaft, the roller assembly comprising:
   a secondary roller comprising a longitudinal roller axis, the secondary roller configured to engage and roll along the second bearing surface of the track; and
   a housing that retains the secondary roller while allowing the secondary roller to rotate about the longitudinal roller axis, wherein the housing is movably coupled to the roller end of the roller shaft with three degrees of rotational freedom relative to the roller end of the roller shaft; and
an outer bearing race at least partially residing within the cavity, wherein the outer bearing race retains and supports the housing of the roller assembly to accommodate the three degrees of rotational freedom.

16. The aircraft of claim 15, wherein:
the track comprises a channel defined by an upper inner surface, a lower inner surface opposing the upper inner surface, and a web extending between the upper inner surface and the lower inner surface;
the first bearing surface of the track corresponds to the upper inner surface or the lower inner surface; and
the second bearing surface of the track corresponds to the web.

17. The aircraft of claim 15, further comprising means for limiting rotation of the housing about at least one axis of rotation.

\* \* \* \* \*